Oct. 15, 1968   F. B. EBY   3,405,896
CHRISTMAS TREE HOLDER
Filed Feb. 17, 1967
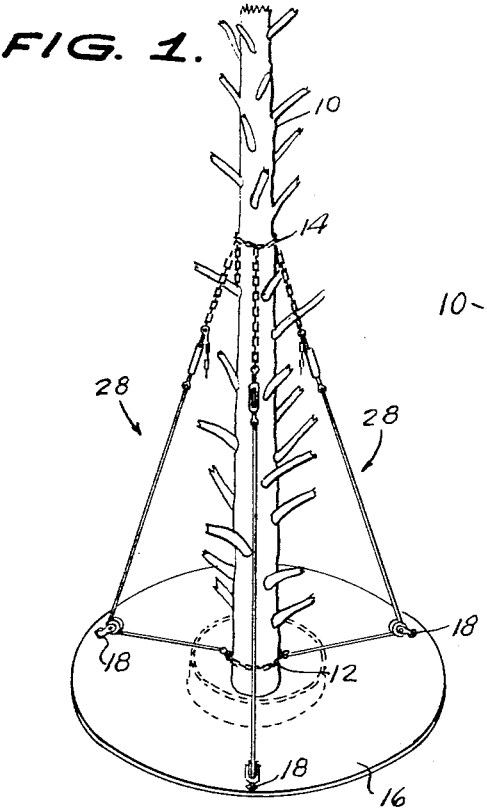
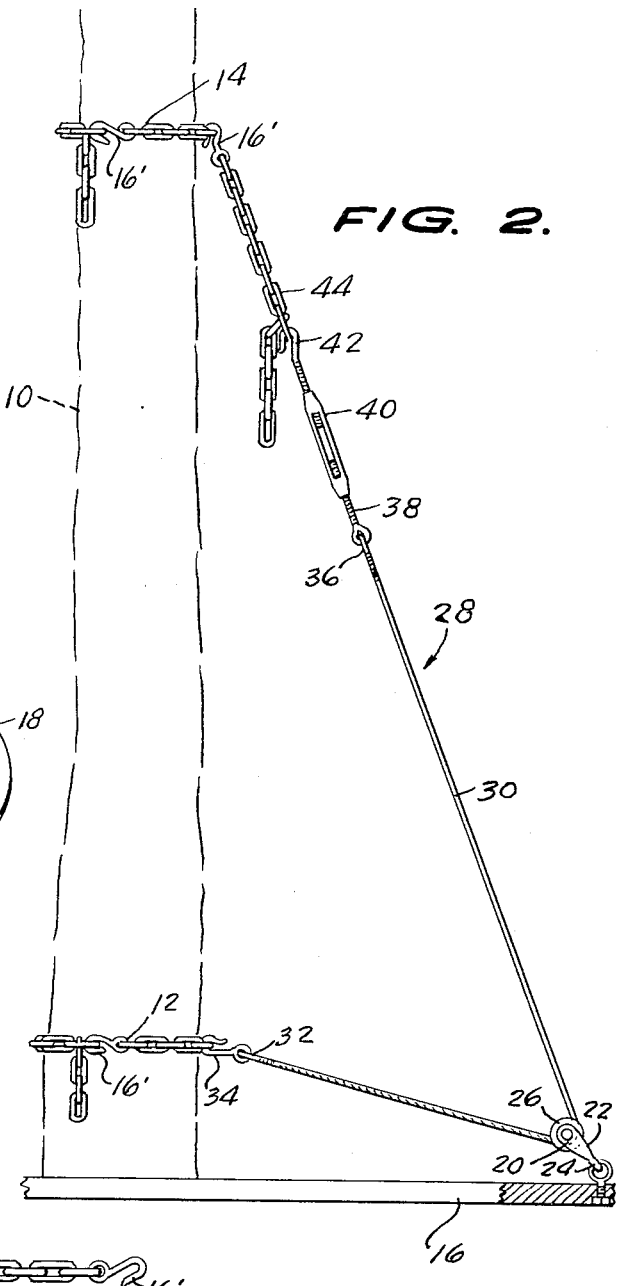
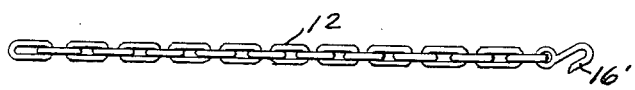
INVENTOR.
FRANK B. EBY,
BY Berman, Davidson & Berman
ATTORNEYS.

United States Patent Office 3,405,896
Patented Oct. 15, 1968

3,405,896
CHRISTMAS TREE HOLDER
Frank B. Eby, Rte. 2, Bristol, Ind. 46507
Filed Feb. 17, 1967, Ser. No. 616,843
6 Claims. (Cl. 248—44)

ABSTRACT OF THE DISCLOSURE

A Christmas tree holder comprising a base member; flexible, adjustable members for gripping the tree at and above the base; radially spaced flexible guy members, each joined respectively to said gripping members and each being trained over a pulley spaced radially from the axis of said tree and each of said members being adjustable.

---

This invention relates to means for holding upright on an untippable base an elongated vertical object such as a Christmas tree.

It is an object of this invention to provide a Christmas tree stand as aforesaid which provides widely spaced, adjustable gripping levels on a tree trunk and which is adjustable to variable circumferences of the tree to be held and is further adjustable as to the supporting guy rope tension to be applied in holding the tree erect.

The above and other objects will be made clear from the following detailed description taken in connection with the annexed drawing, in which:

FIGURE 1 is a perspective view showing the device in operative position supporting a Christmas tree;

FIGURE 2 is a side elevation on a larger scale showing the application of the upper and lower gripping means and the connection of these means to the guy ropes; and FIGURE 3 is a detailed view showing one of the gripping means.

As anyone who has ever set up a Christmas tree knows, the job not only is prickly but sticky and dirty as well. Every time so much as a twig has to be trimmed, or the bark has to be punctured, the dirtiness and stickiness increase. Moreover, with a perversity worthy of the most malevolent of the inanimate, branches, and "bumps" seem to occur at precisely those points at which they interfere with the tree holder and therefore require pruning, adding, perforce, to the stickiness and dirtiness of the job. The present invention is based on the old adage "if you can't lick 'em, join 'em." In other words, if the tree does not conform to the holder, let the holder conform to the tree and let it do so without cuts and punctures which add to the stickiness and dirtiness of a job which, but for the Christmas spirit, would be universally regarded as a dirty job indeed. The tree holder of this invention at all times and in every respect accommodates itself to the exigencies of the particular tree and never requires pruning, trimming or puncturing of the trunk.

Referring now to FIGURE 1, a Christmas tree (pretty well denuded in favor of clarity of illustration) is indicated by the numeral 10. A chain 12 encircles the base of the tree and a similar length of chain 14 encircles the tree at whatever height above the butt is considered suitable for vertical stability and is free of branches. The tree rests on a base member 16 which as shown is a circular disc and while the disc shown is solid and preferably made of ⅝- to ¾-inch plywood, the material does not matter. As a matter of fact, a metal spider could be substituted for the disc without ill effect. Equally spaced around the periphery of the disc 16 are screw eyes or ring bolts 18 into each of which is hooked or otherwise secured a pulley 20.

As detailed in FIGURE 2, these pulleys involve a form of clevis 22, having at its closed end a hook 24 with a grooved wheel 26, journaled between its open arms. This is an excellent and smooth working arrangement but in many cases, the eye bolt 18 would suffice by itself. As used in this specification, and in the claims, the word "pulley" shall include not only the structure illustrated in FIGURE 2, but a screw eye or eye bolt or any other equivalent device adequate for the purpose.

There are also provided a plurality of flexible members designated generally by the numeral 28. Each of these members are made up of several parts which may be described as follows:

Each member 28 comprises a section 30 of rope or cable. The sections 30 pass through the pulleys 20 and, as shown in FIGURE 2, ride on the wheels 26. Each rope section 30 has at one end a loop 32 adapted to pass freely through the pulley and to engage an S-hook 34, which in turn engages a link in the base chain 12. It will be understood from FIGURE 3 that the chain 12 (and of course also the chain 14) has at one end a hook 16′ which may be engaged with any link in the chain 12 in order to encircle the trunk of the tree 10 snugly whatever the diameter of the trunk. While in FIGURE 3 the hook 16′ is permanently attached to the chain 12, a detachable, conventional S-hook, of course, could be used. The opposite end of the rope 30 has a loop 36 secured to an eye bolt 38, which in turn is screwed into one end of a turnbuckle 40. A similar eye bolt or hook 42 engages a link of a supplementary length of chain 44 which at its opposite end has either a hook 16′ similar to that shown in FIGURE 3 or a conventional S-hook which engages a link of the chain 14.

In use, the chains 12 and 14 may be applied while the tree is in the back yard and horizontal, and with a convenience heretofore unknown, in the setting up of Christmas trees. Meanwhile, in the house, the base 16 has been placed at the appropriate location, the loops 32 of the ropes 30 have been passed through the pulleys 20 and engaged with the S-hooks 34. The tree is then placed on the base 16 and the S-hooks 34 are engaged with the appropriate links of the chain 12. The S-hooks 16′ are then engaged with appropriate links of the chain 14 and a rough adjustment is made for tension by engagement of the hooks 42 with appropriate links of the chain 44. Final adjustment and tensioning is accomplished by means of the turnbuckles 40. It will be noted that it has not been necessary to trim or puncture the tree 10, and the entire job has been accomplished with an absolute minimum of trial and error. There is not a specialized part in the entire construction and any part of the device easily can be replaced at the nearest hardware store. Even the base 16 can be replaced at the nearest lumber dealer.

While certain specific embodiments have been disclosed herein for the purpose of description, no doubt various modifications will occur to those skilled in the art. It is not intended, therefore, to limit this invention to the precise details disclosed but only as set forth in the subjoined claims.

What is claimed is:

1. A Christmas tree holder comprising: a base member; a pair of adjustable, flexible tree encircling members; a plurality of means secured to said base member in equilaterally spaced relationship, each of said means being adapted to be penetrated by a flexible guy member and to permit sliding of said member through said means; a plurality of flexible members, one for each said means, each of such members having at each of its ends means manually attachable to one of said encircling members, and means to adjust the tension of said flexible members.

2. A tree holder as set forth in claim 1, in which the means secured to said base include pulleys.

3. A tree holder as set forth in claim 1, in which the manually attachable means of said guy members are hooks.

4. A tree holder as set forth in claim 1, in which said encircling members are chains with hooks engaging portions of said chains to provide circumferential adjustment.

5. A tree holder as set forth in claim 4, in which the manually attachable means of said guy members are hooks.

6. A tree holder as set forth in claim 5, in which the means secured to said base are pulleys.

References Cited

UNITED STATES PATENTS

| | | | |
|---|---|---|---|
| 2,260,932 | 10/1941 | Chulick et al. | 248—44 |
| 2,444,390 | 6/1948 | White | 248—48 |
| 2,503,446 | 4/1950 | MacLatchie | 248—48 |
| 3,353,773 | 11/1967 | Budd | 248—44 |

ROY D. FRAZIER, *Primary Examiner.*

FRANK DOMOTOR, *Assistant Examiner.*